(12) United States Patent
Su et al.

(10) Patent No.: US 8,724,067 B2
(45) Date of Patent: May 13, 2014

(54) ACTIVE DEVICE ARRAY SUBSTRATE

(71) Applicant: Au Optronics Corporation, Hsinchu (TW)

(72) Inventors: Kuo-Chang Su, Taichung (TW);
Kuo-Hua Hsu, Taoyuan County (TW);
Chun-Hsin Liu, Yunlin County (TW);
Yung-Chih Chen, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/928,397

(22) Filed: Jun. 27, 2013

(65) Prior Publication Data
US 2013/0293821 A1 Nov. 7, 2013

Related U.S. Application Data

(62) Division of application No. 12/858,433, filed on Aug. 17, 2010, now Pat. No. 8,502,948.

(30) Foreign Application Priority Data

May 20, 2010 (TW) .............................. 99116097 A

(51) Int. Cl.
*G02F 1/1343* (2006.01)
(52) U.S. Cl.
USPC ......................................... 349/143; 349/139

(58) Field of Classification Search
None
See application file for complete search history.

(56) References Cited

U.S. PATENT DOCUMENTS

| | | | | |
|---|---|---|---|---|
| 2006/0034125 A1* | 2/2006 | Kim et al. | ................ | 365/185.22 |
| 2006/0081850 A1* | 4/2006 | Lee et al. | ......................... | 257/72 |
| 2006/0120160 A1* | 6/2006 | Park et al. | ............... | 365/185.22 |
| 2006/0164350 A1* | 7/2006 | Kim et al. | ....................... | 345/87 |
| 2008/0079678 A1* | 4/2008 | Cho et al. | ......................... | 345/88 |
| 2009/0109357 A1* | 4/2009 | Liu et al. | ......................... | 349/37 |
| 2010/0265238 A1* | 10/2010 | Lee et al. | ...................... | 345/211 |
| 2011/0134103 A1* | 6/2011 | Nam et al. | .................... | 345/212 |

* cited by examiner

*Primary Examiner* — Mike Stahl
(74) *Attorney, Agent, or Firm* — Jianq Chyun IP Office

(57) ABSTRACT

An active device array substrate includes a substrate, first scan lines, second scan lines, data lines, and pixels. The first and the second scan lines are alternately arranged along a first direction. The data lines are arranged in parallel along a second direction. The pixels are arranged to form first pixel rows and second pixel rows alternately arranged in the first direction. The first pixel row includes first and second pixels electrically connected to the first scan lines, the second scan lines, and the data line, respectively. The second pixel row includes third and fourth pixels electrically connected to the first scan lines, the second scan lines, and the data line, respectively. The pixels between two adjacent data lines are arranged in two columns. Among the pixels in the same column, the pixels in odd rows and in even rows are electrically connected to different data lines, respectively.

6 Claims, 13 Drawing Sheets

ACTIVE DEVICE ARRAY SUBSTRATE

CROSS-REFERENCE TO RELATED APPLICATION

This application is a divisional of and claims the priority benefit of U.S. application Ser. No. 12/858,433 filed on Aug. 17, 2010, now allowed, which claims the priority benefit of Taiwan application serial no. 99116097, filed on May 20, 2010. The entirety of each of the above-mentioned patent applications is hereby incorporated by reference herein and made a part of specification.

BACKGROUND OF THE INVENTION

1. Field of the Invention

The invention relates to a substrate and particularly relates to an active device array substrate.

2. Description of Related Art

One of the pixel array structures of existing liquid crystal display (LCD) panels is referred to as a half source driver (HSD) design. Under the HSD design, the number of scan lines is doubled, and two adjacent pixels share a data line, such that the number of the data lines and the number of required source drivers are reduced by half. Thereby, manufacturing costs of pixel arrays can be lowered down.

It is noted that the LCD panel having the HSD design is driven in a dot-inversion manner or a two-dot-inversion manner, and thus signal polarity applied to each of the data lines needs to be converted as long as display data of pixels in a row are written. As a result, power consumption of the source drivers is significant. In order to reduce power consumption, it has been proposed that the LCD panel having the HSD design and proper pixel arrangement is driven in a row-inversion manner so as to achieve the same display effects as accomplished by the LCD panel driven in the dot-inversion manner or in the two-dot-inversion manner. Nevertheless, according to the conventional arrangement of pixels, once display pattern including dark and bright patterns alternately arranged in columns or alternately arranged in dots are displayed, a level of a common voltage Vcom is pulled up or pulled down because a coupling effect is generated between the common line and the data lines. As such, parts of the pixels encounter issues of excessively high display luminance or excessively low display luminance, and uneven dark and bright lines or dots are observed easily.

SUMMARY OF THE INVENTION

The invention is directed to an active device array substrate capable of eliminating a coupling effect caused by each data line to a common voltage, such that a level of the common voltage is not pulled up or pulled down.

In the invention, an active device array substrate including a substrate, a plurality of first scan lines, a plurality of second scan lines, a plurality of data lines, and a plurality of pixels is provided. The first scan lines and the second scan lines are alternately arranged along a first direction on the substrate. The data lines are arranged in parallel along a second direction on the substrate and intersect with the first scan lines and the second scan lines. The pixels are arranged to form a plurality of first pixel rows and a plurality of second pixel rows. The first pixel rows and the second pixel rows are alternately arranged along the first direction. Each of the first pixel rows includes a plurality of first pixels and a plurality of second pixels. The first pixels and the second pixels are alternately arranged along the second direction. The first pixels are electrically connected to the first scan lines and the data lines, and the second pixels are electrically connected to the second scan lines and the data lines. Each of the second pixel rows includes a plurality of third pixels and a plurality of fourth pixels. The third pixels and the fourth pixels are alternately arranged along the second direction. The third pixels are electrically connected to the first scan lines and the data lines, and the fourth pixels are electrically connected to the second scan lines and the data lines. The pixels located in two adjacent data lines are arranged in two columns, and among the pixels located in the same column, parts of the pixels in odd rows and the other pixels in even rows are electrically connected to different data lines, respectively.

According to an embodiment of the invention, the first pixels and the fourth pixels located between two adjacent data lines are substantially aligned in the first direction, and the second pixels and the third pixels located between two adjacent data lines are substantially aligned in the first direction.

According to an embodiment of the invention, the first pixels and the third pixels located between two adjacent data lines are electrically connected to one of the two adjacent data lines, and the second pixels and the fourth pixels located between two adjacent data lines are electrically connected to the other one of the two adjacent data lines.

According to an embodiment of the invention, the first pixels and the second pixels have different polarities, the first pixels and the third pixels have a same polarity, and the second pixels and the fourth pixels have a same polarity.

According to an embodiment of the invention, in each of the first pixel rows, the first pixels and the second pixels electrically connected to even-numbered data lines have a first polarity, the first pixels and the second pixels electrically connected to odd-numbered data lines have a second polarity, and the first polarity is different from the second polarity.

According to an embodiment of the invention, the first pixels and the third pixels located between two adjacent data lines are substantially aligned in the first direction, and the second pixels and the fourth pixels located between two adjacent data lines are substantially aligned in the first direction.

According to an embodiment of the invention, the first pixels and the fourth pixels located between two adjacent data lines are electrically connected to one of the two adjacent data lines, and the second pixels and the third pixels located between two adjacent data lines are electrically connected to the other one of the two adjacent data lines.

According to an embodiment of the invention, the first pixels and the second pixels have different polarities, the first pixels and the fourth pixels have a same polarity, and the second pixels and the third pixels have a same polarity.

According to an embodiment of the invention, in each of the second pixel rows, the third pixels and the fourth pixels electrically connected to even-numbered data lines have a first polarity, the third pixels and the fourth pixels electrically connected to odd-numbered data lines have a second polarity, and the first polarity is different from the second polarity.

In the invention, an active device array substrate including a substrate, a plurality of first scan lines, a plurality of second scan lines, a plurality of first data lines, a plurality of second data lines, and a plurality of pixels is provided. The first scan lines and the second scan lines are alternately arranged along a first direction on the substrate. The first data lines and the second data lines are alternately arranged along a second direction on the substrate and intersect with the first scan lines and the second scan lines. The pixels include a plurality of first display units and a plurality of second display units. Each of the first display units includes a first pixel and a second pixel, and each of the second display units includes a third pixel and a fourth pixel. The first pixels are electrically connected to the first scan lines and the first data lines, the second pixels are electrically connected to the second scan lines and the first data lines, the third pixels are electrically connected to the first scan lines and the second data lines, and the fourth pixels are electrically connected to the second scan lines and the second data lines. The first display units and the second display units are alternately arranged in the first direction and the second direction.

According to an embodiment of the invention, the first display units and the second display units are substantially aligned in the first direction and the second direction.

According to an embodiment of the invention, the pixels in an $n^{th}$ row are arranged in an order of the first pixels, the second pixels, the third pixels, and the fourth pixels, the pixels in an $(n+1)^{th}$ row are arranged in an order of the fourth pixels, the third pixels, the second pixels, and the first pixels, and n is an integer.

According to an embodiment of the invention, between two adjacent first data line and second data line of the first and the second data lines, the first pixels and the fourth pixels are substantially aligned in the first direction.

According to an embodiment of the invention, between two adjacent first data line and second data line of the first and the second data lines, the second pixels and the third pixels are substantially aligned in the first direction.

According to an embodiment of the invention, the pixels in an $n^{th}$ row are arranged in an order of the first pixels, the second pixels, the third pixels, and the fourth pixels, the pixels in an $(n+1)^{th}$ row are arranged in an order of the third pixels, the fourth pixels, the first pixels, and the second pixels, and n is an integer.

According to an embodiment of the invention, between two adjacent first data line and second data line of the first and the second data lines, the first pixels and the third pixels are substantially aligned in the first direction.

According to an embodiment of the invention, between two adjacent first data line and second data line of the first and the second data lines, the second pixels and the fourth pixels are substantially aligned in the first direction.

According to an embodiment of the invention, the first pixels and the second pixels have the same polarity, the third pixels and the fourth pixels have the same polarity, and the first pixels and the third pixels have different polarities.

To sum up, mature column-inversion technology is applied to the active device array substrate of the invention, so as to achieve the same display effects as accomplished by applying the two-dot-inversion technology. In addition, the arrangement of the pixels in the invention results in elimination of the coupling effect caused by each of the data lines to the common voltage, such that the level of the common voltage is not pulled up or pulled down. In conclusion, satisfactory display quality can be guaranteed when the active device array substrate of the invention is employed.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a conventional active device array substrate having an HSD structure, display effects generated by two-dot-inversion can be achieved when the column-inversion technology is applied. However, a common voltage level is likely to be pulled up or pulled down due to a coupling effect caused by each data line to the common voltage, thus resulting in unfavorable display quality of an LCD panel. Accordingly, the invention is directed to an active device array substrate in which the pixel arrangement is capable of eliminating the coupling effect caused by each of the data lines to the common voltage, such that the level of the common voltage is not pulled up or pulled down.

Figure 1:
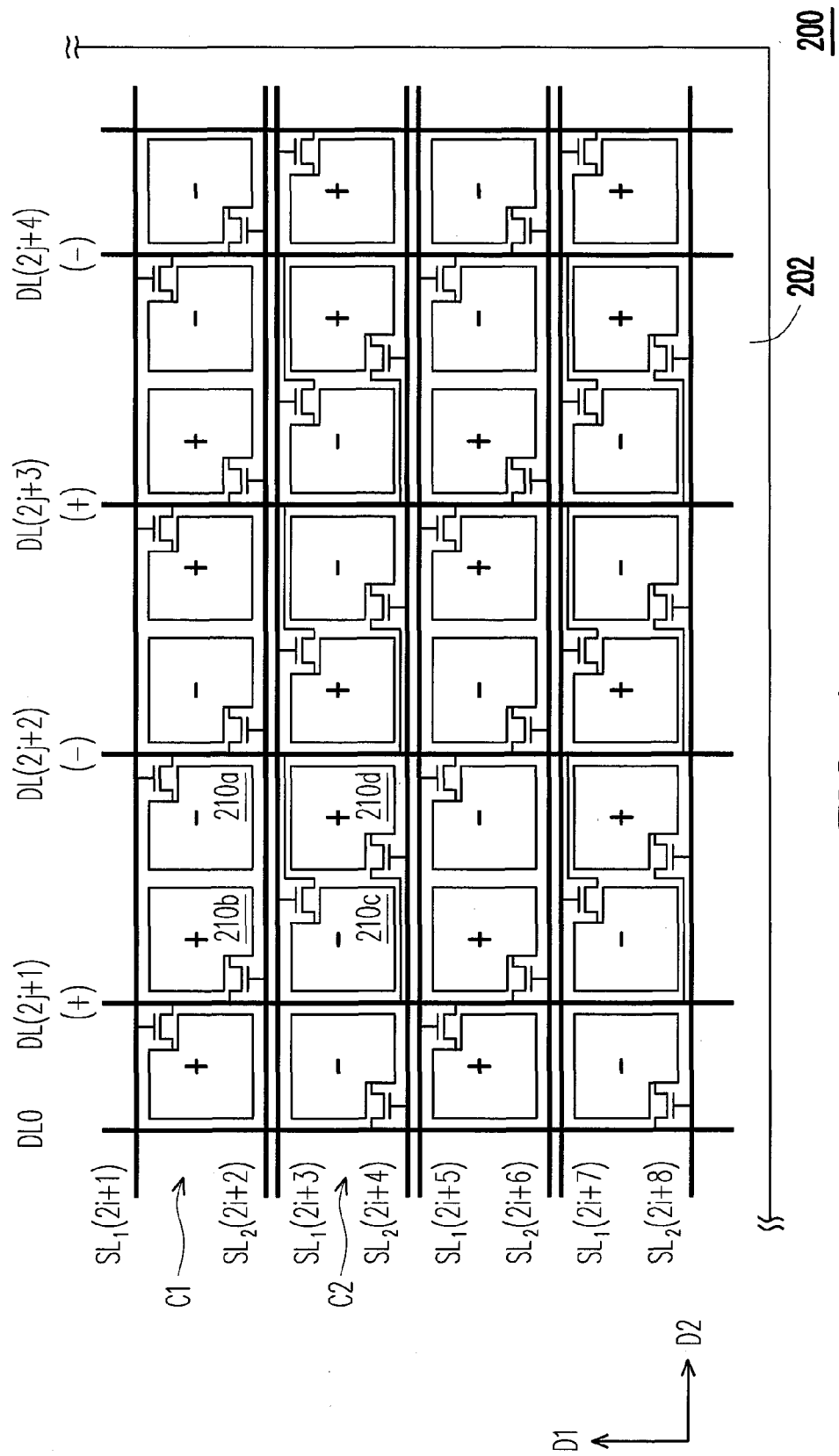
FIG. 1 is a schematic view illustrating a structure and a driving method of an active device array substrate according to an embodiment of the invention.

FIG. 1 is a schematic view illustrating a structure and a driving method of an active device array substrate according to an embodiment of the invention. As shown in FIG. 1, an active device array substrate 200 of this embodiment includes a substrate 202, a plurality of first scan lines $SL_1(2i+1)$, $SL_1(2i+3)$, $SL_1(2i+5)$, and $SL_1(2i+7)$, a plurality of second scan lines $SL_2(2i+2)$, $SL_2(2i+4)$, $SL_2(2i+6)$, and $SL_2(2i+8)$, a plurality of data lines DL0, DL(2j+1), DL(2j+2), DL(2j+3), and DL(2j+4), and a plurality of pixels 210a~210d. Here, i and j are zero or positive integers. The first scan lines $SL_1(2i+1)$, $SL_1(2i+3)$, $SL_1(2i+5)$, and $SL_1(2i+7)$ and the second scan lines $SL_2(2i+2)$, $SL_2(2i+4)$, $SL_2(2i+6)$, and $SL_2(2i+8)$ are arranged alternately along a first direction D1 on the substrate 202. The data lines DL0, DL(2j+1), DL(2j+2), DL(2j+3), and DL(2j+4) are arranged in parallel along a second direction D2 on the substrate 202 and intersect with the first scan lines $SL_1(2i+1)$, $SL_1(2i+3)$, $SL_1(2i+5)$, and $SL_1(2i+7)$ and the second scan lines $SL_2(2i+2)$, $SL_2(2i+4)$, $SL_2(2i+6)$, and $SL_2(2i+8)$. In this embodiment, the first direction D1 is a column direction, and the second direction D2 is a row direction, for instance.

The pixels 210a~210d of this embodiment are arranged to form a plurality of first pixel rows $C_1$ and a plurality of second pixel rows $C_2$ alternately arranged in the first direction D1. Each of the first pixel rows $C_1$ includes a plurality of first pixels 210a and a plurality of second pixels 210b alternately arranged along the second direction D2. The first pixels 210a are electrically connected to the first scan lines $SL_1(2i+1)$, $SL_1(2i+3)$, $SL_1(2i+5)$, and $SL_1(2i+7)$ and the data lines DL0, DL(2j+1), DL(2j+2), DL(2j+3), and DL(2j+4). The second pixels 210b are electrically connected to the second scan lines $SL_2(2i+2)$, $SL_2(2i+4)$, $SL_2(2i+6)$, and $SL_2(2i+8)$ and the data lines DL0, DL(2j+1), DL(2j+2), DL(2j+3), and DL(2j+4). Each of the second pixel rows C2 includes a plurality of third pixels 210c and a plurality of fourth pixels 210d alternately arranged along the second direction D2. The third pixels 210c are electrically connected to the first scan lines $SL_1(2i+1)$, $SL_1(2i+3)$, $SL_1(2i+5)$, and $SL_1(2i+7)$ and the data lines DL0, DL(2j+1), DL(2j+2), DL(2j+3), and DL(2j+4). The fourth pixels 210d are electrically connected to the second scan lines $SL_2(2i+2)$, $SL_2(2i+4)$, $SL_2(2i+6)$, and $SL_2(2i+8)$ and the data lines DL0, DL(2j+1), DL(2j+2), DL(2j+3), and DL(2j+4).

As shown in FIG. 1, the pixels 210a~210d between two adjacent data lines DL(2j+1), DL(2j+2), DL(2j+3), and DL(2j+4) are arranged in two columns. Among the pixels in the same column, the pixels in odd rows and the pixels in even rows are electrically connected to different data lines, respectively. To be more specific, between two adjacent data lines DL(2j+1), DL(2j+2), DL(2j+3), and DL(2j+4), the first pixels 210a and the fourth pixels 210d are arranged in a column, and the second pixels 210b and the third pixels 210c are arranged in a column. In other words, the first pixels 210a and the fourth pixels 210d between two adjacent data lines DL(2j+1), DL(2j+2), DL(2j+3), and DL(2j+4) are substantially aligned in the first direction D1, and the second pixels 210b and the third pixels 210c between two adjacent data lines DL0, DL(2j+1), DL(2j+2), DL(2j+3), and DL(2j+4) are substantially aligned in the first direction D1. Among the first pixels 210a and the fourth pixels 210d arranged in the same column, parts of the first pixels 210a located in odd rows (i.e. the first row and the third row) and parts of the fourth pixels 210d located in even rows (i.e. the second row and the fourth row) are electrically connected to the first scan lines $SL_1(2i+1)$ and $SL_1(2i+5)$ and the second scan lines $SL_2(2i+4)$ and $SL_2(2i+8)$. Similarly, among the second pixels 210b and the third pixels 210c arranged in the same column, parts of the second pixels 210b located in the odd rows (i.e. the first row and the third row) and parts of the third pixels 210c located in the even rows (i.e. the second row and the fourth row) are electrically connected to the second scan lines $SL_2(2i+2)$ and $SL_2(2i+6)$ and the first scan lines $SL_1(2i+3)$ and $SL_1(2i+7)$.

Besides, the first pixels 210a and the third pixels 210c located between two adjacent data lines DL0, DL(2j+1), DL(2j+2), DL(2j+3), and DL(2j+4) are electrically connected to the same data line, and the second pixels 210b and the fourth pixels 210d located between two adjacent data lines DL0, DL(2j+1), DL(2j+2), DL(2j+3), and DL(2j+4) are electrically connected to the same data line. For instance, between the two adjacent data lines DL(2j+1) and DL(2j+2), the first pixels 210a and the third pixels 210c are electrically connected to the same data line DL(2j+2), and the second pixels 210b and the fourth pixels 210d are electrically connected to the same data line DL(2j+1).

With reference to FIG. 1, in this embodiment, data driving chips (not shown) input corresponding data voltages (or signals) to the corresponding pixels 210a~210d through each of the data lines DL(2j+1), DL(2j+2), DL(2j+3), and DL(2j+4), such that each of the pixels 210a~210d is allowed to achieve a predetermined display effect. As indicated in FIG. 1, a driving method of this embodiment includes inputting a signal with a first polarity (e.g. the positive polarity "+") into the odd-numbered data lines DL(2j+1) and DL(2j+3) and inputting a signal with a second polarity (e.g. the negative polarity "−") into the even-numbered data lines DL(2j+2) and DL(2j+4) within the same frame period. Besides, within the next frame period, the signal with the negative polarity "−" is input into the odd-numbered data lines DL(2j+1) and DL(2j+3), and the signal with the positive polarity "+" (not shown) is input into the even-numbered data lines DL(2j+2) and DL(2j+4). That is to say, the polarity of the input signal is converted once during one frame period of an LCD. When the scan lines $SL_1(2i+1)$, $SL_2(2i+2)$, $SL_1(2i+3)$, $SL_2(2i+4)$, $SL_1(2i+5)$, $SL_2(2i+6)$, $SL_1(2i+7)$, and $SL_2(2i+8)$ are sequentially turned on from top to bottom, each of the data lines DL(2j+1), DL(2j+2), DL(2j+3), and DL(2j+4) sequentially supplies different data voltages (or signals) to be input into the corresponding pixels 210a~210d.

According to this embodiment, the first pixels 210a and the third pixels 210c are electrically connected to the same one of the data lines DL(2j+1), DL(2j+2), DL(2j+3), and DL(2j+4), and therefore the first pixels 210a and the third pixels 210c have the same polarity. Likewise, the second pixels 210b and the fourth pixels 210d are electrically connected to the same one of the data lines DL(2j+1), DL(2j+2), DL(2j+3), and DL(2j+4), and therefore the second pixels 210b and the fourth pixels 210d have the same polarity. Between the two adjacent data lines DL(2j+1) and DL(2j+2), the first pixels 210a and the third pixels 210c, for example, have the second polarity "−", and the second pixels 210b and the fourth pixels 210d, for example, have the first polarity "+". Namely, the first pixels 210a and the second pixels 210b have different polarities. Similarly, between the two adjacent data lines DL(2j+2) and DL(2j+3), the first pixels 210a and the third pixels 210c, for example, have the first polarity "+", and the second pixels 210b and the fourth pixels 210d, for example, have the second polarity "−". Namely, the first pixels 210a and the second pixels 210b have different polarities. Moreover, in each of the first pixel rows $C_1$, the first pixels 210a and the second pixels 210b electrically connected to the even-numbered data lines DL(2j+2) and DL(2j+4), for example, have the second polarity "−", and the first pixels 210a and the second pixels 210b electrically connected to the odd-numbered data lines DL(2j+1) and DL(2j+3), for example, have the first polarity "+". In other words, according to this embodiment, the signal with the first polarity is input to the odd-numbered data lines DL(2j+1) and DL(2j+3), and the signal with the second polarity is input to the even-numbered data lines DL(2j+2) and DL(2j+4), so as to achieve the display effect as accomplished by the pixel array driven in the two-dot-inversion manner as indicated in FIG. 1.

Even though the first polarity is the positive polarity, and the second polarity is the negative polarity in this embodiment, the first and the second polarities in other embodiments can respectively be the negative and the positive polarities.

With proper arrangement of each of the pixels 210a~210d in the pixel array, the corresponding scan lines $SL_1(2i+1)$, $SL_2(2i+2)$, $SL_1(2i+3)$, $SL_2(2i+4)$, $SL_1(2i+5)$, $SL_2(2i+6)$, $SL_1$ (2i+7), and SL$_2$(2i+8), and the corresponding data lines DL0, DL(2j+1), DL(2j+2), DL(2j+3), and DL(2j+4), the active device array substrate 200 of this embodiment can achieve the two-dot-inversion display effect through applying the mature column-inversion technology. In addition, the pixel arrangement of this embodiment contributes to removal of the coupling effect generated between each of the data lines and the common voltage, such that the level of the common voltage is not pulled up or pulled down. As such, display mura can be prevented, and satisfactory display quality can be achieved with reduced power consumption and costs.

Figure 2:
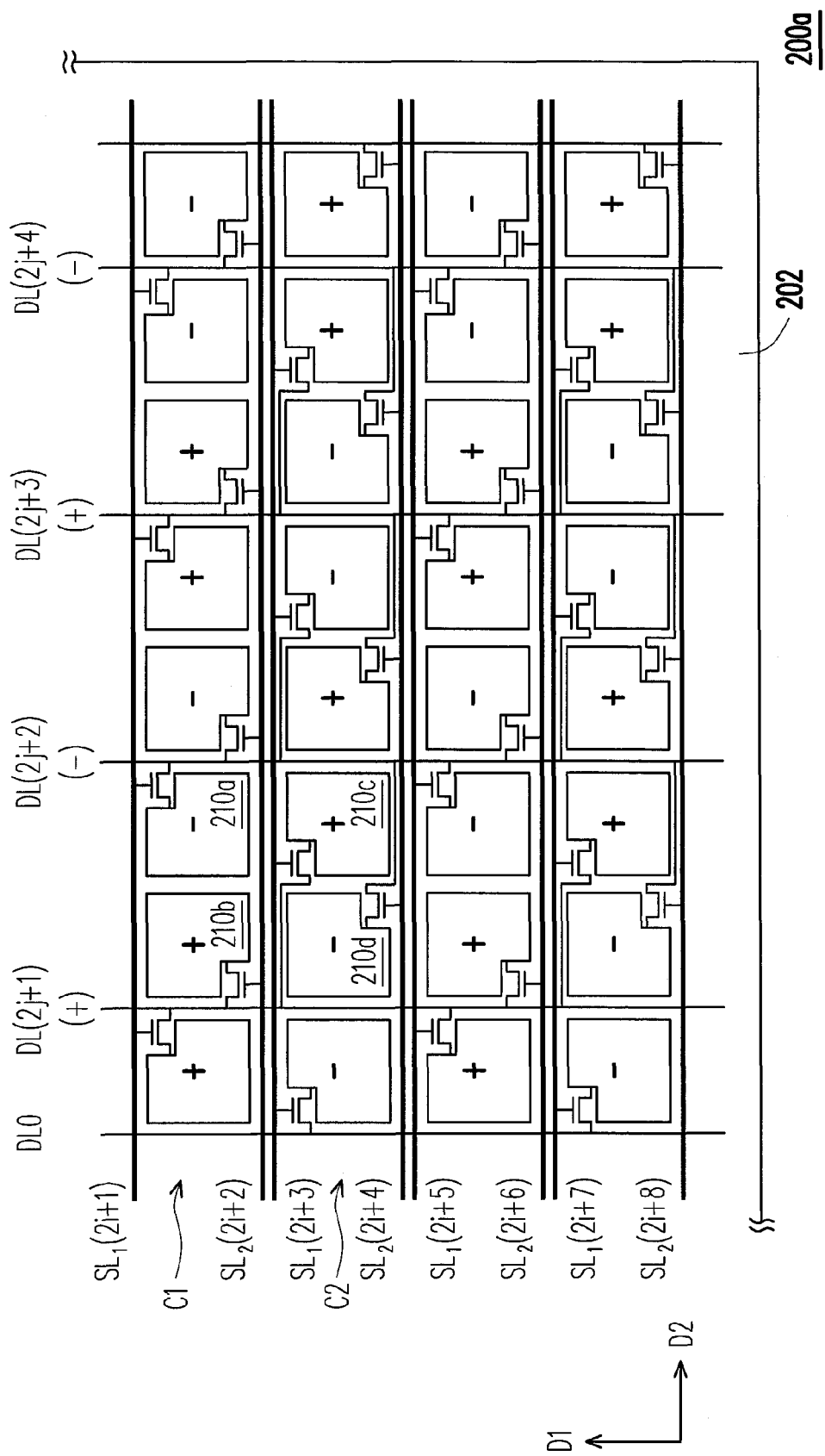
FIG. 2 is a schematic view illustrating a structure and a driving method of an active device array substrate according to another embodiment of the invention.

FIG. 2 is a schematic view illustrating a structure and a driving method of an active device array substrate according to another embodiment of the invention. An active device array substrate 200*a* depicted in FIG. 2 and the active device array substrate 200 depicted in FIG. 1 have approximately the same components, while the main difference therebetween lies in the way to electrically connect the third and the fourth pixels to the data lines and the scan lines. Said difference and the driving method are elaborated hereinafter.

With reference to FIG. 2, in this embodiment, the first pixels 210*a* and the third pixels 210*c* between two adjacent data lines of the data lines DL(2j+1), DL(2j+2), DL(2j+3), and DL(2j+4) are substantially aligned in the first direction D1, and the second pixels 210*b* and the fourth pixels 210*d* between two adjacent data lines of the data lines DL(2j+1), DL(2j+2), DL(2j+3), and DL(2j+4) are substantially aligned in the first direction D1. Besides, the first pixels 210*a* and the fourth pixels 210*d* located between two adjacent data lines of the data lines DL(2j+1), DL(2j+2), DL(2j+3), and DL(2j+4) are electrically connected to the same data line, and the second pixels 210*b* and the third pixels 210*c* located between two adjacent data lines of the data lines DL0, DL(2j+1), DL(2j+2), DL(2j+3), and DL(2j+4) are electrically connected to the same data line. For instance, between the two adjacent data lines DL(2j+1) and DL(2j+2), the first pixels 210*a* and the fourth pixels 210*d* are electrically connected to the same data line DL(2j+2), and the second pixels 210*b* and the third pixels 210*c* are electrically connected to the same data line DL(2j+1).

When the invention is actually applied, data driving chips (not shown) input corresponding data voltages (or signals) to the corresponding pixels 210*a*~210*d* through each of the data lines DL(2j+1), DL(2j+2), DL(2j+3), and DL(2j+4), such that each of the pixels 210*a*~210*d* is allowed to achieve a predetermined display effect. As indicated in FIG. 2, a driving method of this embodiment includes inputting a signal with a first polarity (e.g. the positive polarity "+") into the odd-numbered data lines DL(2j+1) and DL(2j+3) and inputting a signal with a second polarity (e.g. the negative polarity "−") into the even-numbered data lines DL(2j+2) and DL(2j+4) within the same frame period. Besides, within the next frame period, the signal with the negative polarity "−" is input into the odd-numbered data lines DL(2j+1) and DL(2j+3), and the signal with the positive polarity "+" (not shown) is input into the even-numbered data lines DL(2j+2) and DL(2j+4). That is to say, the polarity of the input signal is converted once during one frame period of the LCD. When the scan lines SL$_1$(2i+1), SL$_2$(2i+2), SL$_1$(2i+3), SL$_2$(2i+4), SL$_1$(2i+5), SL$_2$(2i+6), SL$_1$(2i+7), and SL$_2$(2i+8) are sequentially turned on from top to bottom, each of the data lines DL(2j+1), DL(2j+2), DL(2j+3), and DL(2j+4) sequentially supplies different data voltages (or signals) to be input into the corresponding pixels 210*a*~210*d*. In particular, the first pixels 210*a* and the fourth pixels 210*d* are electrically connected to the same one of the data lines DL(2j+1), DL(2j+2), DL(2j+3), and DL(2j+4), and therefore the first pixels 210*a* and the fourth pixels 210*d* have the same polarity. Likewise, the second pixels 210*b* and the third pixels 210*c* are electrically connected to the same one of the data lines DL(2j+1), DL(2j+2), DL(2j+3), and DL(2j+4), and therefore the second pixels 210*b* and the third pixels 210*c* have the same polarity.

Between the two adjacent data lines DL(2j+1) and DL(2j+2), the first pixels 210*a* and the fourth pixels 210*d*, for example, have the second polarity "−", and the second pixels 210*b* and the third pixels 210*c*, for example, have the first polarity "+". Namely, the first pixels 210*a* and the second pixels 210*b* have different polarities. Similarly, between the two adjacent data lines DL(2j+2) and DL(2j+3), the first pixels 210*a* and the fourth pixels 210*d*, for example, have the first polarity "+", and the second pixels 210*b* and the third pixels 210*c*, for example, have the second polarity "−". Namely, the first pixels 210*a* and the second pixels 210*b* have different polarities. Moreover, in each of the second pixel rows C$_2$, the third pixels 210*c* and the fourth pixels 210*d* electrically connected to the even-numbered data lines DL(2j+2) and DL(2j+4), for example, have the second polarity "−", and the third pixels 210*c* and the fourth pixels 210*d* electrically connected to the odd-numbered data lines DL(2j+1) and DL(2j+3), for example, have the first polarity "+". In other words, according to this embodiment, the signal with the first polarity is input to the odd-numbered data lines DL(2j+1) and DL(2j+3), and the signal with the second polarity is input to the even-numbered data lines DL(2j+2) and DL(2j+4), so as to achieve the display effect as accomplished by the pixel array driven in the two-dot-inversion manner as indicated in FIG. 2.

Figure 3:
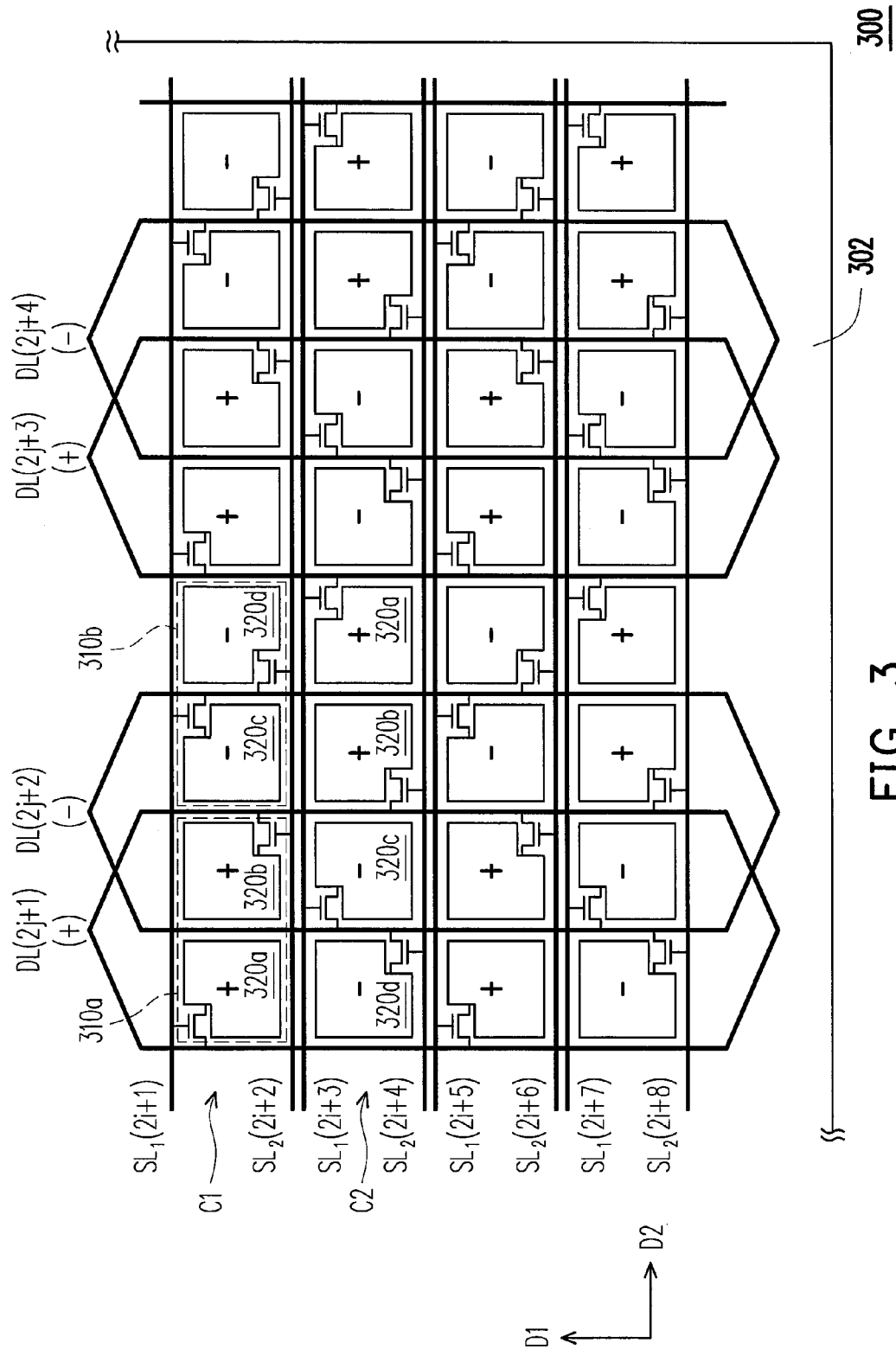
FIG. 3 is a schematic view illustrating a structure and a driving method of an active device array substrate according to still another embodiment of the invention.

FIG. 3 is a schematic view illustrating a structure and a driving method of an active device array substrate according to still another embodiment of the invention. As shown in FIG. 3, an active device array substrate 300 of this embodiment includes a substrate 302, a plurality of first scan lines SL$_1$(2i+1), SL$_1$(2i+3), SL$_1$(2i+5), and SL$_1$(2i+7), a plurality of second scan lines SL$_2$(2i+2), SL$_2$(2i+4), SL$_2$(2i+6), and SL$_2$(2i+8), a plurality of first data lines DL(2j+1) and DL(2j+3), a plurality of second data lines DL(2j+2) and DL(2j+4), and a plurality of pixels 320*a*~320*d*. Here, i and j are natural numbers. The first scan lines SL$_1$(2i+1), SL$_1$(2i+3), SL$_1$(2i+5), and SL$_1$(2i+7) and the second scan lines SL$_2$(2i+2), SL$_2$(2i+4), SL$_2$(2i+6), and SL$_2$(2i+8) are arranged alternately along a first direction D1 on the substrate 302. The first data lines DL(2j+1) and DL(2j+3) and the second data lines DL(2j+2) and DL(2j+4) are arranged alternately along a second direction D2 on the substrate 302 and intersect with the first scan lines SL$_1$(2i+1), SL$_1$(2i+3), SL$_1$(2i+5), and SL$_1$(2i+7) and the second scan lines SL$_2$(2i+2), SL$_2$(2i+4), SL$_2$(2i+6), and SL$_2$(2i+8). In this embodiment, the first direction D1 is a column direction, and the second direction D2 is a row direction, for instance.

The pixels 320*a*~320*d* include a plurality of first display units 310*a* and a plurality of second display units 310*b*. Each of the first display units 310*a* includes a first pixel 320*a* and a second pixel 320*b*, and each of the second display units 310*b* includes a third pixel 320*c* and a fourth pixel 320*d*. The first pixels 320*a* are electrically connected to the first scan lines SL$_1$(2i+1), SL$_1$(2i+3), SL$_1$(2i+5), and SL$_1$(2i+7) and the first data lines DL(2j+1) and DL(2j+3). The second pixels 320*b* are electrically connected to the second scan lines SL$_2$(2i+2), SL$_2$(2i+4), SL$_2$(2i+6), and SL$_2$(2i+8) and the first data lines DL(2j+1) and DL(2j+3). The third pixels 320*c* are electrically connected to the first scan lines SL$_1$(2i+1), SL$_1$(2i+3), SL$_1$(2i+5), and SL$_1$(2i+7) and the second data lines DL(2j+2) and DL(2j+4). The fourth pixels 320*d* are electrically connected to the second scan lines SL$_2$(2i+2), SL$_2$(2i+4), SL$_2$(2i+6), and $SL_2(2i+8)$ and the second data lines $DL(2j+2)$ and $DL(2j+4)$. Here, the first display units 310a and the second display units 310b are alternately arranged in the first direction D1 and the second direction D2.

According to this embodiment, the first display units 310a and the second display units 310b are substantially aligned in the first direction D1 and the second direction D2, for example. Besides, the pixels 320a~320d in the odd rows (e.g. the first row and the third row) are arranged in an order of the first pixels 320a, the second pixels 320b, the third pixels 320c, and the fourth pixels 320d. The pixels 320a~320d in the even rows (e.g. the second row and the fourth row) are arranged in an order of the fourth pixels 320d, the third pixels 320c, the second pixels 320b, and the first pixels 320a. That is to say, in this embodiment, the pixels 320a~320d in the $n^{th}$ row are arranged in an order of the first pixels 320a, the second pixels 320b, the third pixels 320c, and the fourth pixels 320d. The pixels 320a~320d in the $(n+1)^{th}$ rows are arranged in an order of the fourth pixels 320d, the third pixels 320c, the second pixels 320b, and the first pixels 320a. Here, n is an integer.

According to this embodiment, between two adjacent first data line and second data line of the first data lines $DL(2j+1)$ and $DL(2j+3)$ and the second data lines $DL(2j+2)$ and $DL(2j+4)$, the first pixels 320a and the fourth pixels 320d are substantially aligned in the first direction D1. Between two adjacent first data line and second data line of the first data lines $DL(2j+1)$ and $DL(2j+3)$ and the second data lines $DL(2j+2)$ and $DL(2j+4)$, the second pixels 320b and the third pixels 320c are substantially aligned in the first direction D1.

With reference to FIG. 3, when this invention is actually applied, data driving chips (not shown) input corresponding data voltages (or signals) to the corresponding pixels 320a~320d through each of the first data lines $DL(2j+1)$ and $DL(2j+3)$ and each of the second data lines $DL(2j+2)$ and $DL(2j+4)$, such that each of the pixels 320a~320d is allowed to achieve a predetermined display effect. As indicated in FIG. 3, a driving method of this embodiment includes inputting a signal with a first polarity (e.g. the positive polarity "+") into the first data lines $DL(2j+1)$ and $DL(2j+3)$ and inputting a signal with a second polarity (e.g. the negative polarity "−") into the second data lines $DL(2j+2)$ and $DL(2j+4)$ within the same frame period. In addition, within the next frame period, the signal with the negative polarity "−" is input into the first data lines $DL(2j+1)$ and $DL(2j+3)$, and the signal with the positive polarity "+" (not shown) is input into the second data lines $DL(2j+2)$ and $DL(2j+4)$. That is to say, the polarity of the input signal is converted once during one frame period of the LCD.

When the scan lines $SL_1(2i+1)$, $SL_2(2i+2)$, $SL_1(2i+3)$, $SL_2(2i+4)$, $SL_1(2i+5)$, $SL_2(2i+6)$, $SL_1(2i+7)$, and $SL_2(2i+8)$ are sequentially turned on from top to bottom, each of the data lines $DL(2j+1)$, $DL(2j+2)$, $DL(2j+3)$, and $DL(2j+4)$ sequentially supplies different data voltages (or signals) to be input into the corresponding pixels 320a~320d. Specifically, in this embodiment, the first pixels 320a and the second pixels 320b are electrically connected to the same one of the first data lines $DL(2j+1)$ and $DL(2j+3)$, and therefore the first pixels 320a and the second pixels 320b have the same polarity. Likewise, the third pixels 320c and the fourth pixels 320d are electrically connected to the same one of the second data lines $DL(2j+2)$ and $DL(2j+4)$, and therefore the third pixels 320c and the fourth pixels 320d have the same polarity. According to this embodiment, the first pixels 320a and the second pixels 320b, for example, have the first polarity "+", and the third pixels 320c and the fourth pixels 320d, for example, have the second polarity "−". Namely, the first pixels 320a and the third pixels 320c have different polarities. In this embodiment, the signal with the first polarity is input to the first data lines $DL(2j+1)$ and $DL(2j+3)$, and the signal with the second polarity is input to the second data lines $DL(2j+2)$ and $DL(2j+4)$, so as to achieve the display effect as accomplished by the pixel array driven in the two-dot-inversion manner as indicated in FIG. 3.

Figure 4:
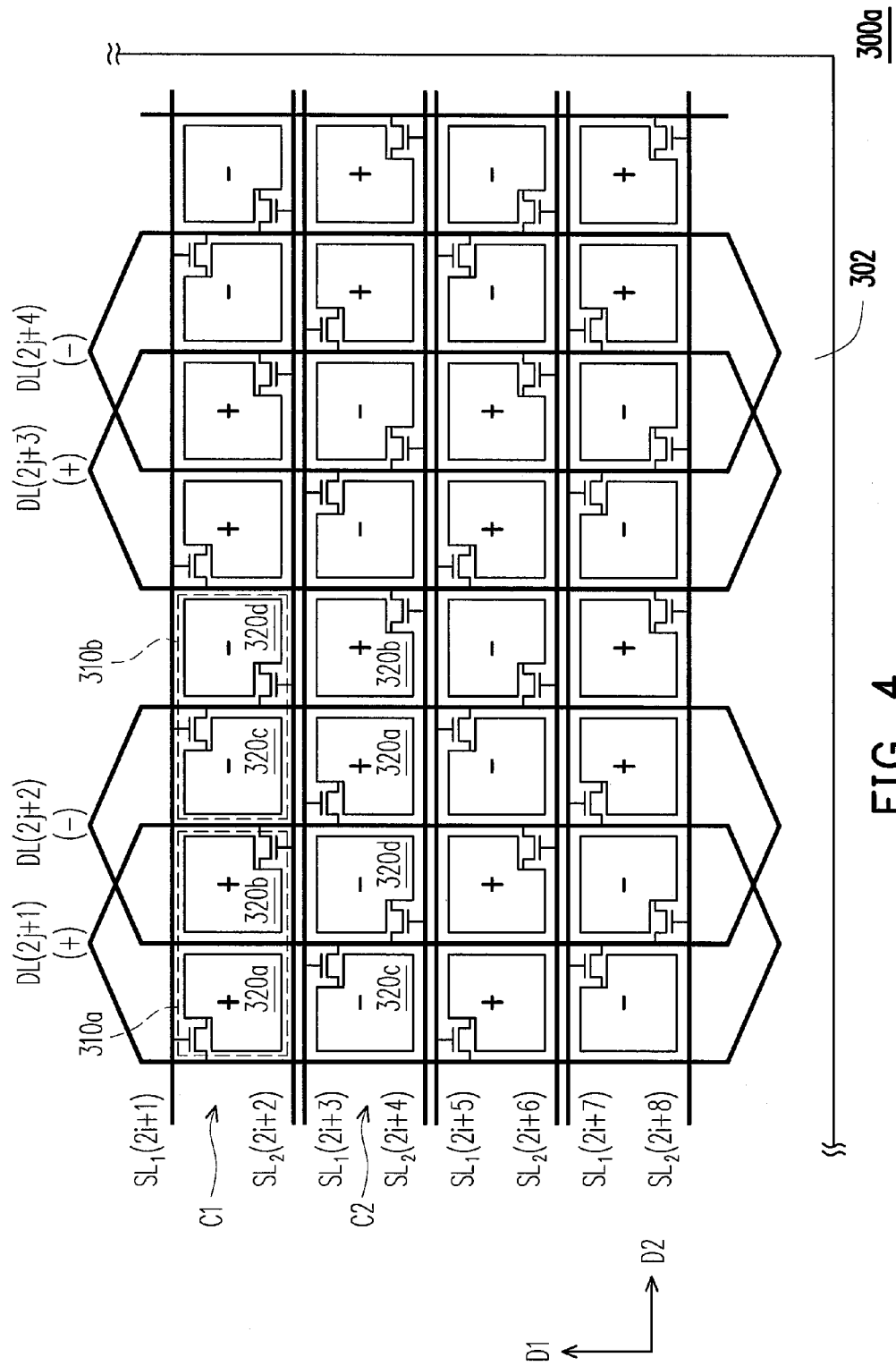
FIG. 4 is a schematic view illustrating a structure and a driving method of an active device array substrate according to still another embodiment of the invention.

FIG. 4 is a schematic view illustrating a structure and a driving method of an active device array substrate according to still another embodiment of the invention. An active device array substrate 300a depicted in FIG. 4 and the active device array substrate 300 depicted in FIG. 3 have approximately the same components, while the main difference therebetween lies in the arrangement of the pixels 320a~320d. Particularly, in the active device array substrate 300a, the pixels 320a~320d in the odd rows (e.g. the first row and the third row) are arranged in an order of the first pixels 320a, the second pixels 320b, the third pixels 320c, and the fourth pixels 320d. The pixels 320a~320d in the even rows (e.g. the second row and the fourth row) are arranged in an order of the third pixels 320c, the fourth pixels 320d, the first pixels 320a, and the second pixels 320b. That is to say, in this embodiment, the pixels 320a~320d in the $n^{th}$ row are arranged in an order of the first pixels 320a, the second pixels 320b, the third pixels 320c, and the fourth pixels 320d. The pixels 320a~320d in the $(n+1)^{th}$ rows are arranged in an order of the third pixels 320c, the fourth pixels 320d, the first pixels 320a, and the second pixels 320b. Here, n is an integer. Hence, according to this embodiment, between two adjacent first data line and second data line of the first data lines $DL(2j+1)$ and $DL(2j+3)$ and the second data lines $DL(2j+2)$ and $DL(2j+4)$, the first pixels 320a and the third pixels 320c are substantially aligned in the first direction D1. Between two adjacent first data line and second data line of the first data lines $DL(2j+1)$ and $DL(2j+3)$ and the second data lines $DL(2j+2)$ and $DL(2j+4)$, the second pixels 320b and the fourth pixels 320d are substantially aligned in the first direction D1. In this embodiment, the first direction D1 is a column direction, and the second direction D2 is a row direction, for instance.

As indicated in FIG. 4, a driving method of this embodiment includes inputting a signal with a first polarity (e.g. the positive polarity "+") into the first data lines $DL(2j+1)$ and $DL(2j+3)$ and inputting a signal with a second polarity (e.g. the negative polarity "−") into the second data lines $DL(2j+2)$ and $DL(2j+4)$ within the same frame period. In addition, within the next frame period, the signal with the negative polarity "−" is input into the first data lines $DL(2j+1)$ and $DL(2j+3)$, and the signal with the positive polarity "+" (not shown) is input into the second data lines $DL(2j+2)$ and $DL(2j+4)$. That is to say, the polarity of the input signal is converted once during one frame period of the LCD. When the scan lines $SL_1(2i+1)$, $SL_2(2i+2)$, $SL_1(2i+3)$, $SL_2(2i+4)$, $SL_1(2i+5)$, $SL_2(2i+6)$, $SL_1(2i+7)$, and $SL_2(2i+8)$ are sequentially turned on from top to bottom, each of the data lines $DL(2j+1)$, $DL(2j+2)$, $DL(2j+3)$, and $DL(2j+4)$ sequentially supplies different data voltages through the data driving chips (not shown), such that the data voltages can be input into the corresponding pixels 320a~320d. Since the first pixels 320a and the second pixels 320b are electrically connected to the same one of the first data lines $DL(2j+1)$ and $DL(2j+3)$, the first pixels 320a and the second pixels 320b have the first polarity "+", for instance. Likewise, the third pixels 320c and the fourth pixels 320d are electrically connected to the same one of the second data lines $DL(2j+2)$ and $DL(2j+4)$, and therefore the third pixels 320c and the fourth pixels 320d have the second polarity "−", for instance. In other words, according to this embodiment, the signal with the first polarity is input to the odd-numbered data lines $DL(2j+1)$ and $DL(2j+3)$, and the signal with the second polarity is input to the even-numbered data lines DL(2j+2) and DL(2j+4), so as to achieve the display effect as accomplished by the pixel array driven in the two-dot-inversion manner as indicated in FIG. 4.

Even though the first polarity is the positive polarity, and the second polarity is the negative polarity in this embodiment, the first and the second polarities in other embodiments can respectively be the negative and the positive polarities.

Note that the active device array substrates 300 and 300a of the previous embodiments can achieve the two-dot-inversion display effect through applying the mature column-inversion technology because of proper arrangement of each of the pixels 320a~320d in the pixel array, the corresponding scan lines $SL_1(2i+1)$, $SL_2(2i+2)$, $SL_1(2i+3)$, $SL_2(2i+4)$, $SL_1(2i+5)$, $SL_2(2i+6)$, $SL_1(2i+7)$, and $SL_2(2i+8)$, and the corresponding data lines DL0, DL(2j+1), DL(2j+2), DL(2j+3), and DL(2j+4). In addition, the arrangement of the pixels in this embodiment contributes to removal of the coupling effect generated between each of the data lines and the common voltage, such that the level of the common voltage is not pulled up or pulled down. As such, display mura can be prevented, and satisfactory display quality can be achieved with reduced power consumption and costs.

Figure 5:
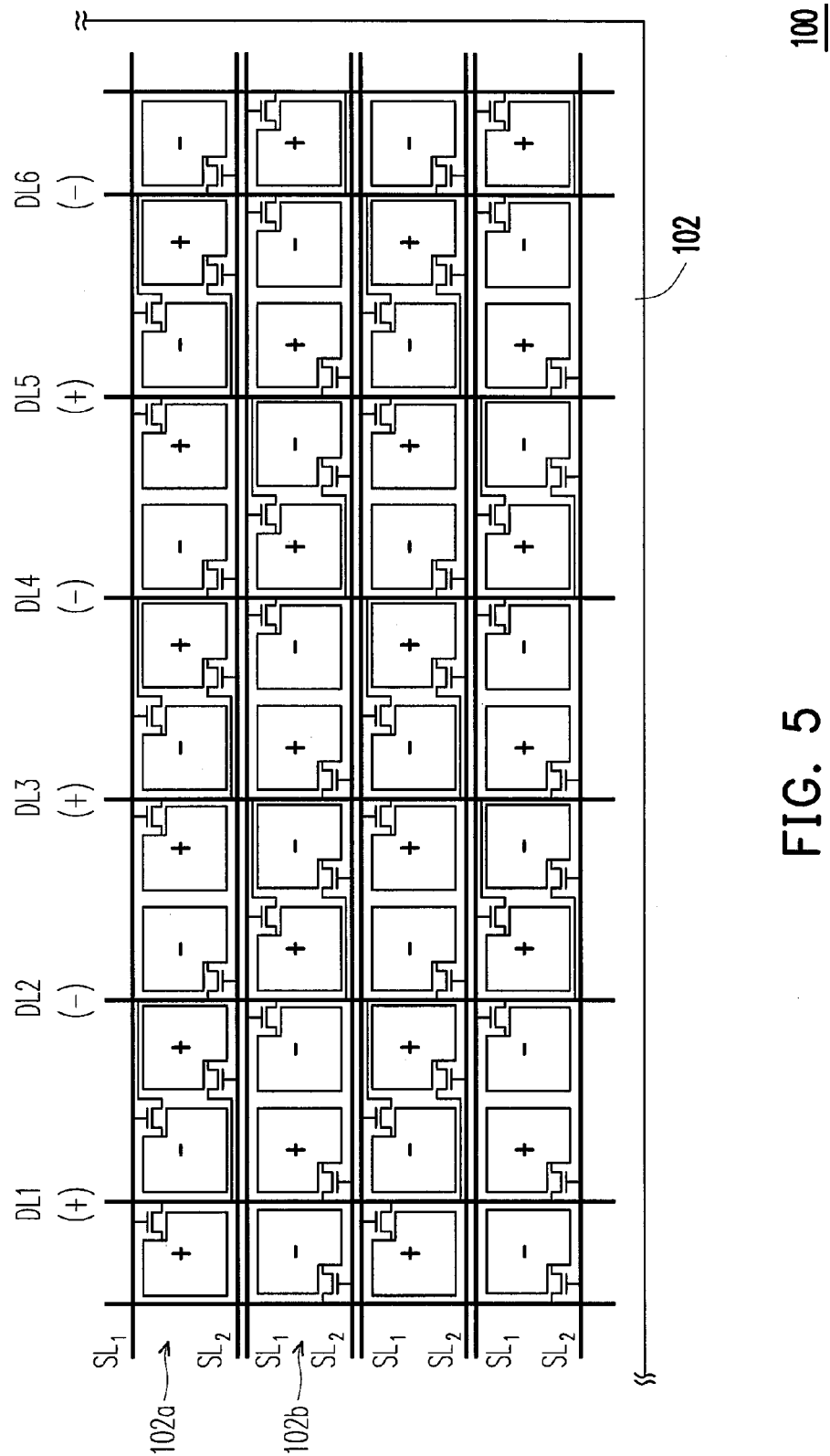
FIG. 5 is a schematic view illustrating a structure and a driving method of an active device array substrate according to a comparison example, and the active device array substrate herein is equipped with an HSD structure and driven in a dot-inversion manner.

When the same test patterns are given in the following experimental example and the following comparison example, the difference between the pixel arrangement of this invention and other pixel arrangements is described hereinafter. Specifically, how the pixel arrangement of this invention can eliminate the coupling effect caused by each of the data lines to the common voltage is elaborated below. Here, the pixel arrangement in the experimental example is as shown in FIG. 1, and the pixel arrangement in the comparison example is as shown in FIG. 5. The pixel arrangement of FIG. 1 is already described above, and therefore only the active device array substrate that is equipped with the HSD structure and driven in the column-inversion manner as shown in FIG. 5 is described herein. In FIG. 5, an active device array substrate 100 includes a plurality of data lines DL1~DL6 disposed on a substrate 102, a plurality of first scan lines $SL_1$, a plurality of second scan lines $SL_2$, and a plurality of pixel rows 102a and 102b. Each of the pixel rows 102a and 102b is disposed between one of the first scan lines $SL_1$ and one of the second scan lines $SL_2$, and each of the pixel rows 102a and 102b includes a plurality of pixels 110. To be more specific, data driving chips (not shown) input corresponding data voltages (or signals) to the corresponding pixels 110 through each of the data lines DL1~DL6, such that each of the pixels 110 is allowed to achieve a predetermined display effect. As indicated in FIG. 5, within the same frame period, a signal with the positive polarity "+" is input into the odd-numbered data lines DL1, DL3, and DL5, and a signal with the negative polarity "−" is input into the even-numbered data lines DL2, DL4, and DL6. Besides, within the next frame period, the signal with the negative polarity "−" is input into the odd-numbered data lines DL1, DL3, and DL5, and the signal with the positive polarity "+" (not shown) is input into the even-numbered data lines DL2, DL4, and DL6. When the scan lines $SL_1$ and $SL_2$ are sequentially turned on from top to bottom, each of the data lines DL1~DL6 sequentially supplies different data voltages (or signals) to be input into the corresponding pixels 110. As indicated in FIG. 5, due to the proper arrangement of the pixels 110, the corresponding scan lines $SL_1$ and $SL_2$, and the corresponding data lines DL1~DL6, the active device array substrate 100 can achieve the same display effects as accomplished by applying the two-dot-inversion technology.

EXPERIMENTAL EXAMPLE

Figure 6A:
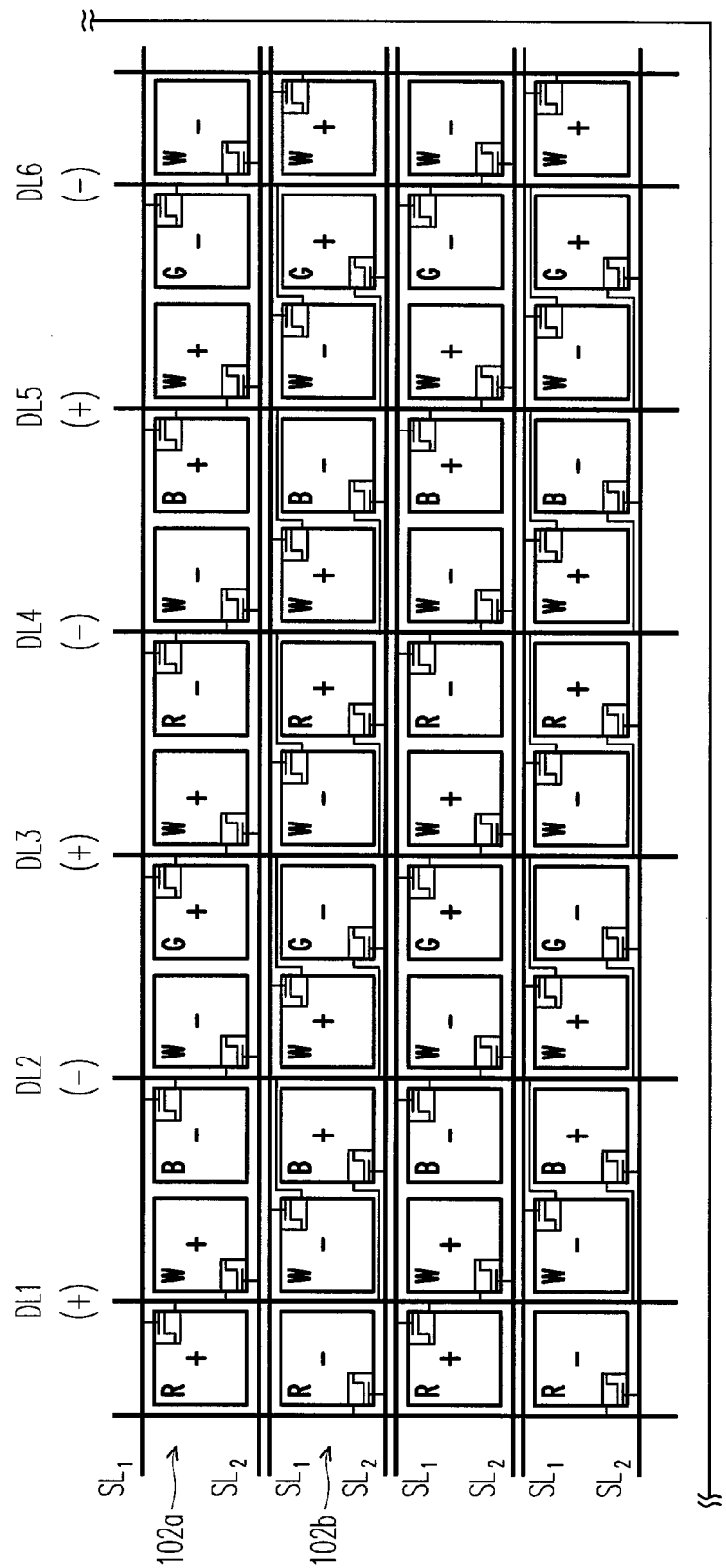
FIG. 6A and FIG. 6B are diagrams respectively illustrating pixel arrangement under test when test patterns 1 are given according to an experimental example and illustrating waveforms of a common voltage level according to the experimental example.
Figure 6B:
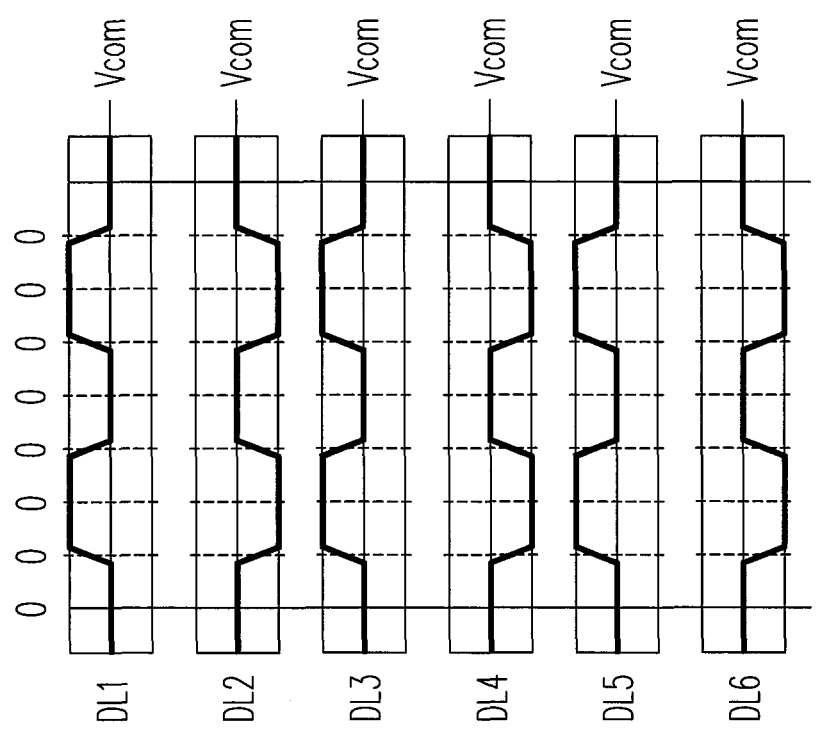
Figure 7A:
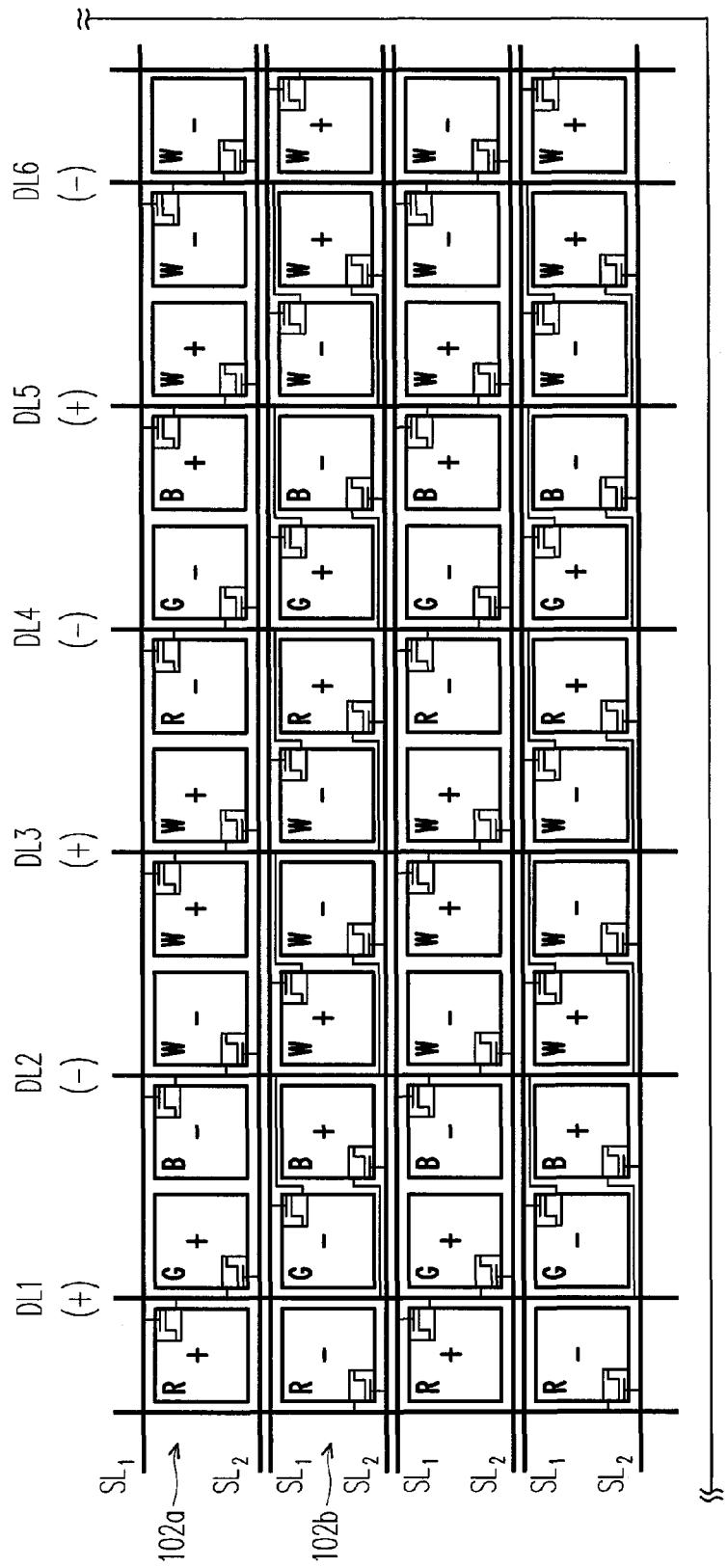
FIG. 7A and FIG. 7B are diagrams respectively illustrating pixel arrangement under test when test patterns 2 are given according to an experimental example and illustrating waveforms of the common voltage level according to the experimental example.
Figure 7B:
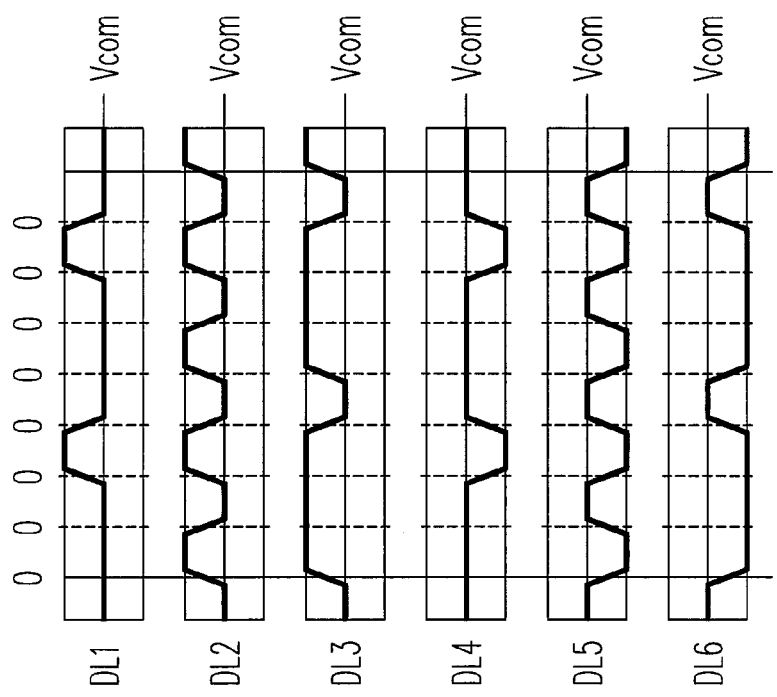

Tests on the pixel arrangement shown in FIG. 1 are conducted with use of the test patterns 1 (sub-pixel V-stripe R, G, B, and W) and the test patterns 2 (pixel V-stripe R, G, B, and W) respectively depicted in FIG. 6A and FIG. 7A, so as to obtain waveforms of common voltage levels as indicated in FIG. 6B and FIG. 7B.

COMPARISON EXAMPLE

Figure 8A:
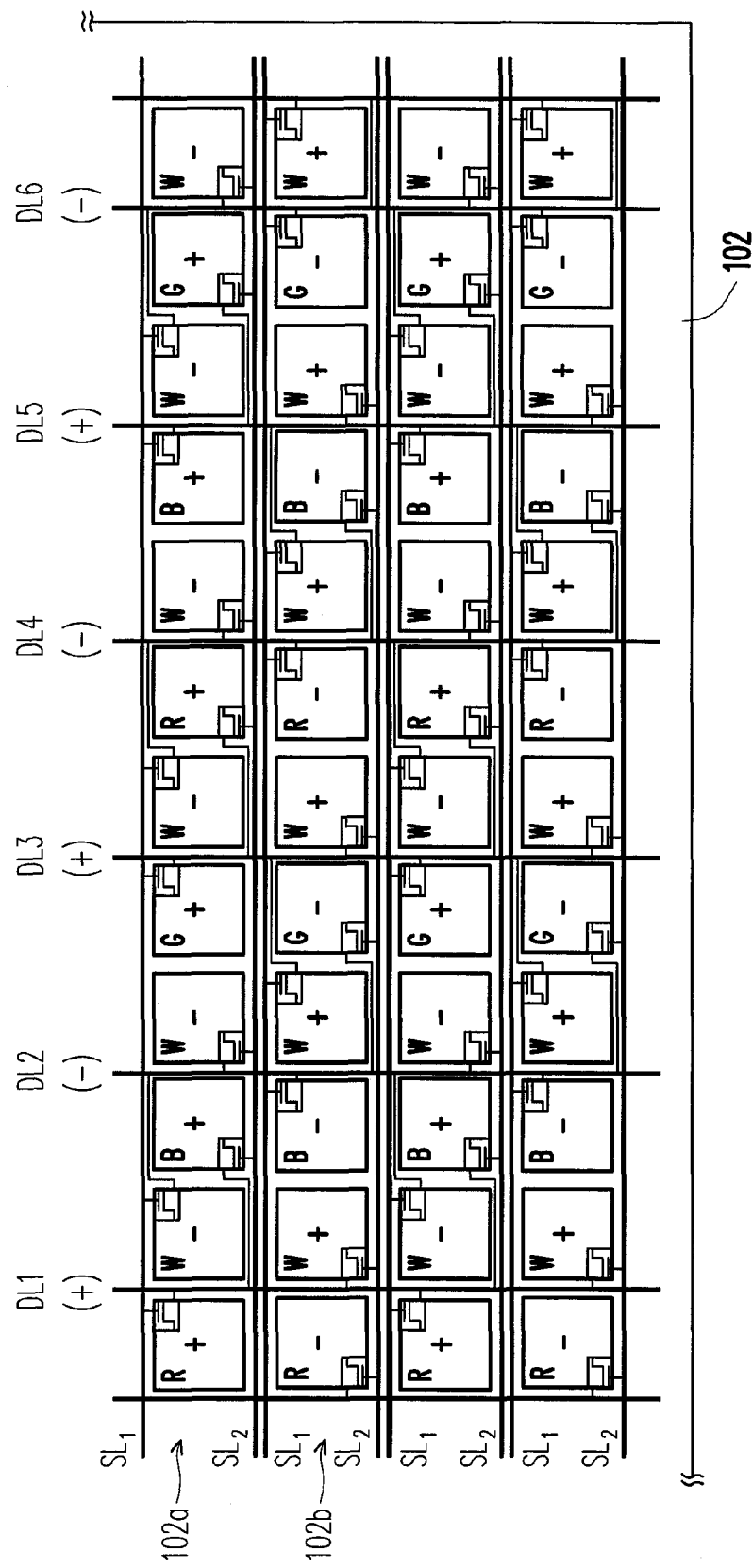
FIG. 8A and FIG. 8B are diagrams respectively illustrating pixel arrangement under test when the test patterns 1 are given according to a comparison example and illustrating waveforms of the common voltage level according to the comparison example.
Figure 8B:
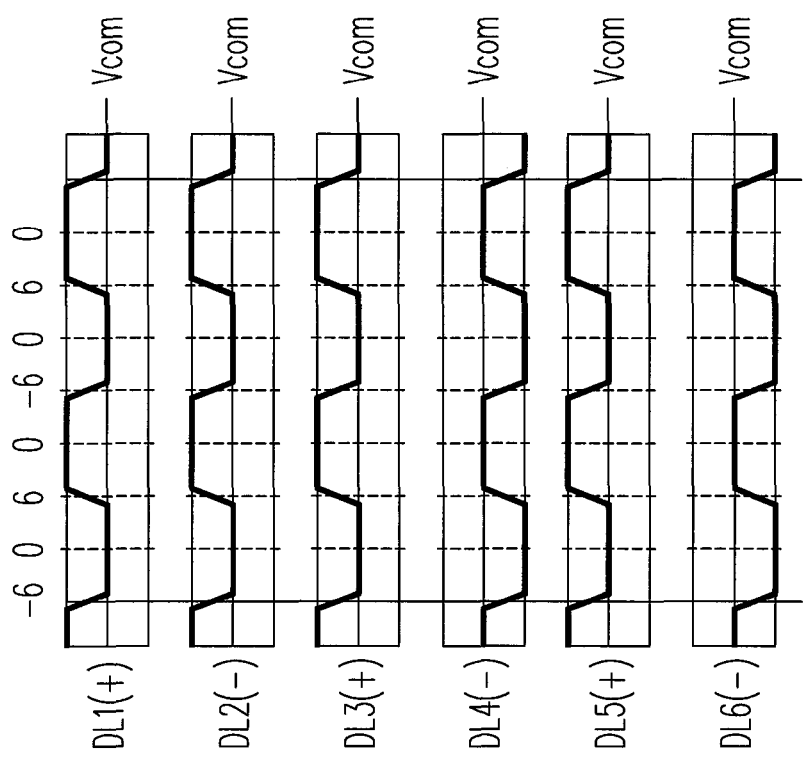
Figure 9A:
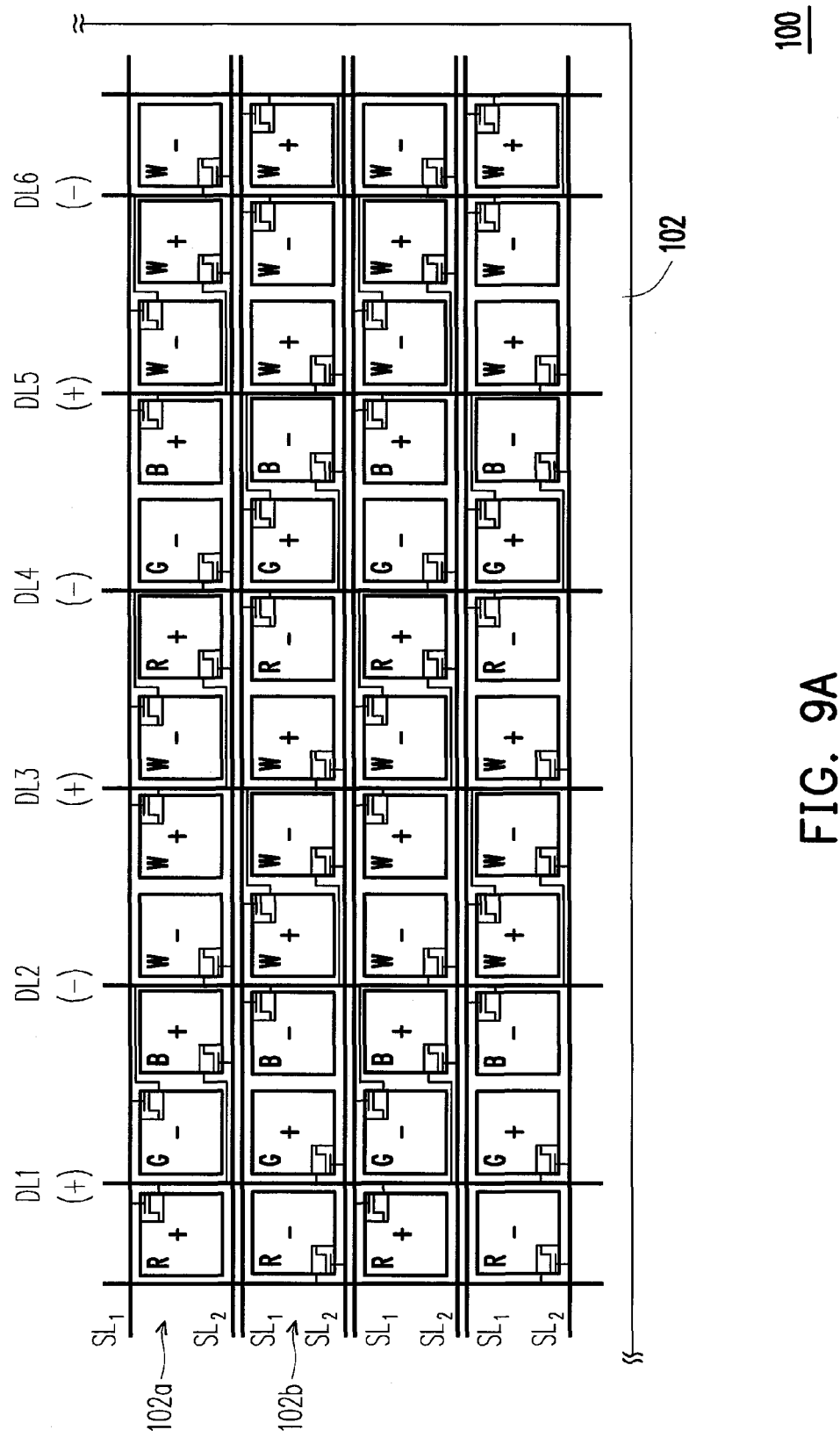
FIG. 9A and FIG. 9B are diagrams respectively illustrating pixel arrangement under test when the test patterns 2 are given according to a comparison example and illustrating waveforms of the common voltage level according to the comparison example.
Figure 9B:
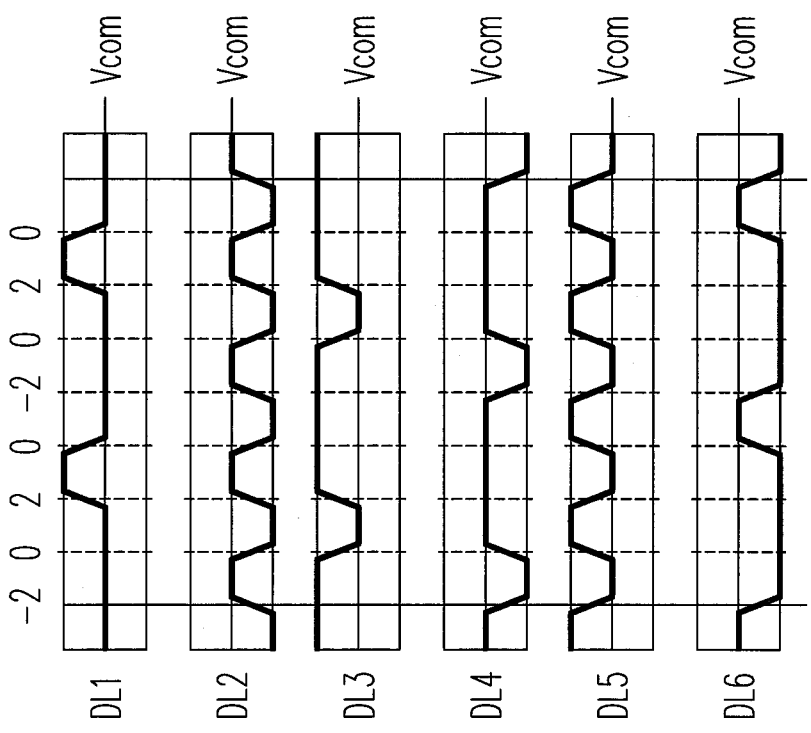

Tests on the pixel arrangement shown in FIG. 5 are conducted with use of the test patterns 1 (sub-pixel V-stripe R, G, B, and W) and the test patterns 2 (pixel V-stripe R, G, B, and W) respectively depicted in FIG. 8A and FIG. 9A, so as to obtain waveforms of common voltage levels as indicated in the right hand side of FIG. 8B and FIG. 9B. That is to say, when the test patterns 1 are given, the tests are conducted according to the experimental example depicted in FIG. 6A and according to the comparison example depicted in FIG. 8A. When the test patterns 2 are given, the tests are conducted according to the experimental example depicted in FIG. 7A and according to the comparison example depicted in FIG. 9A. Thereby, the difference therebetween can be shown.

In FIG. 6B and FIG. 7B, when signals with the positive and the negative polarities are input into the data lines DL1~DL6 within the same frame period, the coupling effect can be eliminated (marked by "0") based on the pixel arrangement and the polarity arrangement described in the invention, and thus the common voltage Vcom is not affected. Namely, the pixel arrangement of the invention contributes to elimination of the coupling effect caused by each of the data lines to the common voltage, such that the level of the common voltage is not pulled up or pulled down, and that favorable display quality can be guaranteed.

On the contrary, in FIG. 8B and FIG. 9B, when signals with the positive and the negative polarities are input into the data lines DL1~DL6 within the same time frame, voltages at the six data lines are simultaneously pulled up (marked by "+6") or pulled down (marked by "−6") based on the pixel arrangement and the polarity arrangement described in the comparison example, as indicated in FIG. 8B. In an alternative, voltages of two of the six data lines are simultaneously pulled up (marked by "+2") or pulled down (marked by "−2"), as indicated in FIG. 9B, such that the common voltage Vcom is affected. That is to say, the level of the common voltage Vcom is pulled up or pulled down because of the coupling effect caused by the data lines DL1~DL6 to the common voltage Vcom. As a result, parts of the pixels encounter issues of excessively high display luminance or excessively low display luminance, and uneven dark and bright lines or dots are displayed on image frame, which gives rise to unfavorable display quality.

Hence, from the above experimental results, the coupling effect caused by each of the data lines to the common voltage can be effectively eliminated based on the pixel arrangement of this invention in comparison with the pixel arrangement described in the comparison example, such that the level of the common voltage is not pulled up or pulled down, and that favorable display quality can be guaranteed.

In light of the foregoing, the active device array substrate of the invention can reduce the power consumption of the data driving chips by means of the HSD structure, so as to save energy and costs. In addition, proper arrangement of the pixels, the scan lines, and the data lines as proposed in the invention results in elimination of the coupling effect caused by each of the data lines to the common voltage, such that the level of the common voltage is not pulled up or pulled down. As such, display mura can be prevented, and satisfactory display quality can be achieved with reduced power consumption and costs.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An active device array substrate comprising:
   a substrate;
   a plurality of first scan lines;
   a plurality of second scan lines, wherein the first scan lines and the second scan lines are alternately arranged along a first direction on the substrate;
   a plurality of data lines arranged in parallel along a second direction on the substrate and intersecting with the first scan lines and the second scan lines; and
   a plurality of pixels arranged to form a plurality of first pixel rows and a plurality of second pixel rows, the first pixel rows and the second pixel rows being alternately arranged along the first direction, each of the first pixel rows comprising a plurality of first pixels and a plurality of second pixels, the first pixels and the second pixels being alternately arranged along the second direction, the first pixels being electrically connected to the first scan lines and the data lines, the second pixels being electrically connected to the second scan lines and the data lines, each of the second pixel rows comprising a plurality of third pixels and a plurality of fourth pixels, the third pixels and the fourth pixels being alternately arranged along the second direction, the third pixels being electrically connected to the first scan lines and the data lines, the fourth pixels being electrically connected to the second scan lines and the data lines, the pixels located between two adjacent data lines are arranged in two columns, wherein among the pixels located in the same column, parts of the pixels in odd rows and the other parts of the pixels in even rows are electrically connected to different data lines, respectively,
   wherein the first pixels and the fourth pixels located between two adjacent data lines are substantially aligned in the first direction, and the second pixels and the third pixels located between two adjacent data lines are substantially aligned in the first direction,
   wherein the first pixels and the third pixels located between two adjacent data lines are electrically connected to one of the two adjacent data lines, and the second pixels and the fourth pixels located between two adjacent data lines are electrically connected to the other one of the two adjacent data lines.

2. The active device array substrate as claimed in claim 1, wherein between two adjacent data lines the first pixels and the second pixels have different polarities, the first pixels and the third pixels have a same polarity, and the second pixels and the fourth pixels have a same polarity.

3. The active device array substrate as claimed in claim 1, wherein in each of the first pixel rows, the first pixels and the second pixels electrically connected to even-numbered data lines have a first polarity, the first pixels and the second pixels electrically connected to odd-numbered data lines have a second polarity, and the first polarity is different from the second polarity.

4. An active device array substrate comprising:
   a substrate;
   a plurality of first scan lines;
   a plurality of second scan lines, wherein the first scan lines and the second scan lines are alternately arranged along a first direction on the substrate;
   a plurality of data lines arranged in parallel along a second direction on the substrate and intersecting with the first scan lines and the second scan lines; and
   a plurality of pixels arranged to form a plurality of first pixel rows and a plurality of second pixel rows, the first pixel rows and the second pixel rows being alternately arranged along the first direction, each of the first pixel rows comprising a plurality of first pixels and a plurality of second pixels, the first pixels and the second pixels being alternately arranged along the second direction, the first pixels being electrically connected to the first scan lines and the data lines, the second pixels being electrically connected to the second scan lines and the data lines, each of the second pixel rows comprising a plurality of third pixels and a plurality of fourth pixels, the third pixels and the fourth pixels being alternately arranged along the second direction, the third pixels being electrically connected to the first scan lines and the data lines, the fourth pixels being electrically connected to the second scan lines and the data lines, the pixels located between two adjacent data lines are arranged in two columns, wherein among the pixels located in the same column, parts of the pixels in odd rows and the other parts of the pixels in even rows are electrically connected to different data lines, respectively, wherein the first pixels and the third pixels located between two adjacent data lines are substantially aligned in the first direction, and the second pixels and the fourth pixels located between two adjacent data lines are substantially aligned in the first direction, and
   wherein the first pixels and the fourth pixels located between two adjacent data lines are electrically connected to one of the two adjacent data lines without being connected to an interconnection disposed between two adjacent scan lines, and the second pixels and the third pixels located between two adjacent data lines are electrically connected to the other one of the two adjacent data lines without being connected to an interconnection disposed between two adjacent scan lines.

5. The active device array substrate as claimed in claim 4, wherein between two adjacent data lines the first pixels and the second pixels have different polarities, the first pixels and the fourth pixels have a same polarity, and the second pixels and the third pixels have a same polarity.

6. The active device array substrate as claimed in claim 4, wherein in each of the second pixel rows, the third pixels and the fourth pixels electrically connected to even-numbered data lines have a first polarity, the third pixels and the fourth pixels electrically connected to odd-numbered data lines have a second polarity, and the first polarity is different from the second polarity.

* * * * *